(12) United States Patent
Thenthiruperai et al.

(10) Patent No.: US 7,302,392 B1
(45) Date of Patent: Nov. 27, 2007

(54) VOICE BROWSER WITH WEIGHTING OF BROWSER-LEVEL GRAMMAR TO ENHANCE USABILITY

(75) Inventors: Balaji S. Thenthiruperai, Overland Park, KS (US); Elizabeth R. Roche, Prairie Village, KS (US); Hyong-Gyun Kim, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 871 days.

(21) Appl. No.: 10/680,961

(22) Filed: Oct. 7, 2003

(51) Int. Cl.
*G10L 15/00* (2006.01)
(52) U.S. Cl. ....................... 704/251; 704/275
(58) Field of Classification Search ............... 704/251, 704/275
See application file for complete search history.

(56) References Cited

U.S. PATENT DOCUMENTS 6,076,061 A * 6/2000 Kawasaki et al. .......... 704/270
6,985,865 B1 * 1/2006 Packingham et al. ....... 704/275
7,181,386 B2 * 2/2007 Mohri et al. .................. 704/1

OTHER PUBLICATIONS

W3C Consortium, Voice eXtensible Markup Language (VoiceXML™) version 1.0 pp. 1-146, May 5, 2000.
W3C Consortium, Voice Extensible Markup Language (VoiceXML) version 2.0, section 5.2, Jan. 28, 2003.

* cited by examiner

Primary Examiner—Daniel Abebe

(57) ABSTRACT

A computer system in the form of a voice command platform includes a voice browser and voice-based applications. The voice browser has global-level grammar elements and the voice applications have application-level grammar and grammar elements. A programming feature is provided by which developers of the voice applications can programmably weigh or weight global-level grammar elements relative to the application-level grammar or grammar elements. As a consequence of the weighting, a speech recognition engine for the voice browser is more likely to accurately recognize voice input from a user. The weighting can be applied on the application as a whole, or at any given state in the application. Also, the weighting can be made to the global level grammar elements as a group, or on an individual basis.

37 Claims, 4 Drawing Sheets

VOICE BROWSER WITH WEIGHTING OF BROWSER-LEVEL GRAMMAR TO ENHANCE USABILITY

BACKGROUND

1. Field of the Invention

This invention relates generally to voice command platforms and voice browsers (e.g., a VoiceXML browser) and voice applications that execute on a voice browser. Specifically, the invention relates to a method of handling the situation of overlapping grammar elements between the browser and the application. This invention has two aspects: one part involves weighting application level grammar relative to browser level grammar, the other part involves specifying which elements must be handled by the browser. The method enhances the user experience by increasing the likelihood of correctly interpreting the speech input from the user and by increasing the likelihood of executing the event that the user intended.

2. Description of Related Art

A voice command platform is a computer-implemented system that provides an interface between speech communication with a user and voice command applications. Generally, a person can call the voice command platform and by speaking commands, can browse through voice command applications and menu items within the voice command application. The voice command platform allows the user to access and interact with information maintained by the voice command applications. The voice command platform includes a browser in order for the voice command platform to execute the logic defined by the voice command application. The browser includes an interpreter which functions to interpret the logic (such as in VoiceXML documents) so as to allow the voice command platform to effectively communicate with a user through speech.

The voice command application can be written or rendered in any of a variety of computer languages. One such language is VoiceXML (or simply "VXML"). VoiceXML is an XML-based markup language defined through the W3C consortium. VoiceXML is used to create voice user interfaces. VXML is a tag-based language similar to Hyper Text Markup Language (HTML) that underlies most Internet web pages. Other analogous languages, such as SpeechML, VoxML, or SALT (Speech Application Language Tags), for instance, are available as well.

An application written in VoiceXML can be accessed through a VoiceXML interpreter otherwise known as a voice browser. A VoiceXML application uses speech recognition grammars, recorded audio files, plain text (which is read by the browser's text-to-speech engines) and VoiceXML documents to engage users in a speech-based interaction. The grammar determines which user utterances the speech recognition engine will recognize at any given point in the application as being acceptable. Grammar is typically specified at the application level. The voice browser also has browser-level grammar. The grammar, at both browser and application levels, consists of a set of individual grammar elements. The global grammar elements in the voice browser are assigned to specific tasks, which are handled by event handling routines consistently across all applications. Examples of global grammar elements include "pause", "help" and "exit". These elements may exist at the application level as well as at the browser/global level.

When user utterances are recognized by the browser as certain grammar elements like "pause" or "bookmark", an event handler is triggered, e.g. when the user says "pause", the application pauses. Depending on the grammar element and the application state, the event will be handled by either the voice browser or the application. For example, having the browser handle "exit" will result in a consistent experience across all applications. On the other hand, it makes sense for the individual applications to handle requests for help with context sensitive help.

In order to avoid presenting the end user with an out of grammar error, it is necessary to allow the voice browser to take over with a browser-level event handler if the events are not handled at the application level. For example, the user may say "help", and there may be some applications in which the application developer did not support a "help" command. The dialogs below show the difference between handling situations like this with an error scenario versus allowing the browser to intervene. The first dialog shows an example of a "help" request, where the application does not support "help":

System: Say the destination city followed by the name of the state.

User: Help

System: I'm sorry. I didn't understand that. Please say the destination city followed by the name of the state.

The following dialog shows how the "help" request could be handled at the browser level, in the situation where the application does not support a "help" request:

System: Say the destination city followed by the name of the state

User: Help

System: There is no help information available for this situation. If you would like help using <name of browser>, just hang on. Otherwise, say "back" to be returned to Flight Tracker.

Furthermore, there may be situations where the acceptable grammar in an application may include utterances that sound like global level grammar elements, and situations where both the application level and the browser level support the same grammar element, like "help" or "bookmark". Thus, two types of conflicts can occur between the application and browser level grammar elements. One is a recognition conflict, in which case the speech recognition engine has to determine whether the user's utterance matches an element of the global level grammar or the application level grammar. The other type of conflict is where the user's utterance is clearly recognized (e.g., "help"), but a match exists between the utterance and both the global level grammar and the application level grammar. In this situation, the question is whether the utterance should be handled (processed by a event handler) at the global (browser) level or at the application level.

In the latter type of conflict, whether the browser or the application should handle a resulting event, for which the utterance may be acceptable grammar at the application level and also at the browser level, varies depending on the particular grammar element in question. For example, having the browser handle "exit" in all instances will result in a more consistent experience across all the applications. On the other hand, it makes sense for the individual applications to handle requests for "help", since they are usually invoked with context sensitive information that the application is more suited to use in responding to the request.

This problem of conflicts between application and browser-level grammar is magnified by the fact that one of the more popular applications for a VoiceXML compliant browser is a voice portal. A voice portal is typically an application or predefined set of applications residing on a common voice command platform that allows callers to retrieve information such as Email, stock quotes, traffic reports, and weather reports. The voice portal and the other third party applications may well coexist on the same voice browser, but the global grammar requirements may vary among the applications. For example, the browser may support bookmarking but an application like voice-activated call centers or voice-activated dialing applications may not wish to do so.

In a primary aspect, the present invention deals with the recognition type of conflict described previously, that is, situations where the user provides speech input in response to a prompt in the application in which the speech input which may resemble somewhat a global grammar element as well as an application-level grammar element. For example, the speech input may somewhat resemble "bookmark" or "help". The invention makes use of the observation that given the particular context or state of the application when the input is provided, the likelihood of the user's intent to invoke the associated browser-level event handling routine can be ascertained or at least estimated. The invention provides a weighting feature by which the global level grammar elements are weighted relative to the application level grammar. The weighting does two things: (a) it helps determine whether the utterance is recognized by the speech recognition engine and (b) it influences the confidence level for the recognition of the utterance. Application developers programmably weight the global level grammar relative to the application level grammar. Such weighting can change depending on the state of the application.

In a related aspect of the present invention, a solution is provided to the situation where a voice browser and the applications running on that browser have overlapping grammar (e.g. both support "help"). The solution is described in the form of a default/override table. The default/override table dictates whether the browser level grammar or the application level grammar should be used to respond to the user's utterance.

SUMMARY

An improvement is provided to a computer system implementing a voice command platform, the platform including a voice browser, a speech recognition engine and voice-based applications. The voice browser has global-level grammar comprising a set of grammar elements and the voice applications have application-level grammar comprising a set of grammar elements. The improvement involves providing in the voice command platform a programming feature by which developers of voice applications can weight global-level grammar elements relative to the application-level grammar and/or application level grammar elements. The speech recognition engine is more likely to properly determine whether voice input from a user phonetically similar to a global-level grammar element and an application level grammar element should trigger an event handler associated with the global-level grammar element or application level grammar element, depending on the weighting.

The weighting of the global level grammar elements relative to the application level grammar and/or grammar elements thus provides a solution to the recognition type of conflict. It helps determine the likelihood of accurately recognizing and correctly responding to the user's utterance. For example, the programmer or developer may determine that at a given application state it is unlikely that a user will provide speech input that will trigger a global level grammar element, such as "cancel", and thus the developer may programmably weight the "cancel" grammar element "low." (The weighting can be for selected global grammar elements or for all of them). If the user says something that sounds kind of like a global level grammar element "cancel", and the utterance is similar sounding to a grammar element at the application level, the low weighting to global level grammar element "cancel" will increase the likelihood of the application level grammar being recognized by the speech recognition engine. As another example, in a flight tracker application, if the user is prompted to input the name of the city where users are seeking flight arrival information and they state something sounding like the city name "Lenexa" (application level grammar), while "exit" (a global grammar) is weighted low, the relative weighting of the global grammar to the application grammar will increase the likelihood of recognizing the city of Lenexa. Consequently, the "exit" browser level event handler routines are not invoked. Instead, the event handler for acceptable speech input "Lenexa" is invoked. The user's experience is thus improved.

In one embodiment, the weighting variable or parameter can be a numerical value, such as a number between 1 and 10 or a decimal value between 0 and 1, such as 0.2. When the value of the global grammar is relatively low, such as 0.2 on a scale from 0 to 1, the application level grammar and/or grammar elements are given preference when a recognition conflict arises. Conversely, when the value of the global level grammar is relatively high, such as 0.9, the browser level grammar is given preference when a recognition conflict arises.

In another embodiment, the weighting programming feature is a variable or parameter programmably changeable to have a value of "low" and "high". A "high" weight means that if a recognition conflict arises between the global or browser level grammar and the application grammar and/or grammar elements, the browser level grammar is given preference. Conversely, "low" means that that the application level grammar and/or grammar elements gets preference.

In one possible embodiment, the weighting programming feature is provided such that it is available for programmably changing at any given application state in the voice applications. Alternatively, the weighting feature could be set once for the entire application and would not change depending on the state of the application. The grammars can be weighed on an individual basis or as a group.

In another aspect, a method is provided of processing speech input in a voice application executed by a voice command platform. The voice command platform includes a speech recognition engine and a voice browser having global-level grammar comprising a set of global level grammar elements. The voice application has application-level grammar comprising a set of application level grammar elements.

The method comprises the steps of:

a) receiving an utterance comprising speech input from a user;

b) applying a weighting of global level grammar elements relative to application level grammar elements;

c) performing a speech recognition process to determine whether the utterance is recognized by a speech recognition engine and the confidence level at which the utterance is recognized;

d) if the utterance matches a global level grammar element and an application level grammar element, invoking an event handler for the utterance by reference to a default/override table; and e) if the utterance matches only one of the global level grammar elements and the application level grammar elements, invoking an event handler associated with the global level grammar element or application level grammar element that matches the utterance. An event handler is defined herein broadly as a software process which executes by responding to a user's speech utterance.

The default/override table mentioned in step (d) is described below in further detail. The table solves the conflict situation where the user's utterance has a match in both the application level grammar and the global-level grammar. The conflict is resolved by reference to the table. The table may state, for example that a particular grammar element like "help", common to both the application level and the browser level, is to be handled by the application, while another grammar element like "cancel" is handled by the browser. The default/override table will typically by dictated by the browser provider.

In still another embodiment, a method is provided for processing speech input in which the following steps are performed: an utterance comprising speech input is received from a user; a weighting is applied to global level grammar elements relative to application level grammar elements; and performing a speech recognition process to determine whether the utterance is recognized by a speech recognition engine and the confidence level at which the utterance is recognized. If the utterance is not recognized as either a global level grammar element or an application level grammar element, an out of grammar event handler is invoked.

In even more general terms, an utterance comprising speech input from a user is received. Weighting is applied to global level grammar elements relative to application level grammar or grammar elements. A speech recognition process is performed to determine whether the utterance is recognized by a speech recognition engine and the confidence level at which said utterance is recognized. The speech recognition process determines whether the utterance matches any global level grammar elements and/or application level grammar elements.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
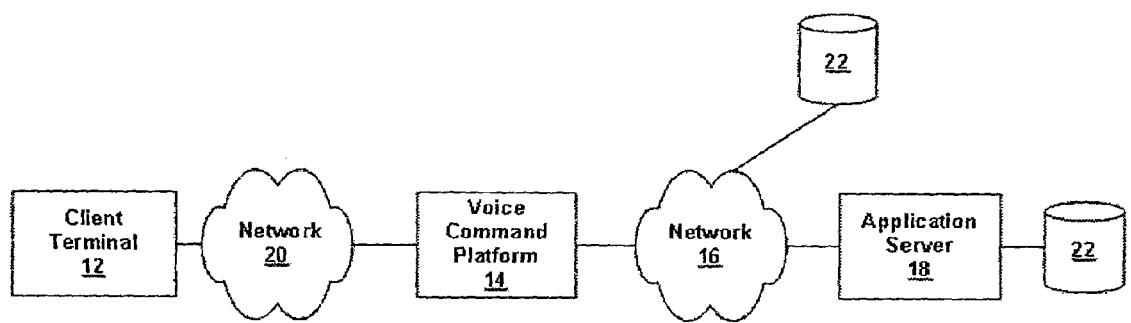
FIG. 1 is a block diagram of a network architecture in which exemplary embodiments of the present invention can be employed.

As a general matter, the exemplary embodiment provides a programming feature in a voice browser by which voice application developers can programmably weight browser level grammar relative to application level grammar. As noted above, the exemplary embodiment can be usefully employed in a voice command platform that functions to receive a user utterance and then take an action in response to the user utterance. Such a voice command platform could be located in a telecommunications network, so that a user can communicate with the platform through a telephone connection or the like. Alternatively, the voice command platform could be located on a client device such as a personal computer or telephone (to support voice-based application control, for instance).

For purposes of illustration and not limitation, this description will focus on the scenario where the exemplary embodiment is carried out in a voice command platform that receives spoken utterances from users via telephone connections. The principles described herein, however, can be applied in or extended to other arrangements that employ speech recognition as well.

In the following detailed description, a general overview of a voice command platform is given to provide context for a preferred embodiment, followed by a more detailed description of a programming feature by which a weighting is applied to global level grammar relative to application level grammar. The details of the voice command platform are not critical and departure from the disclosed embodiment may occur while still using the essential teachings of the present invention.

Exemplary Voice Command Platform

An exemplary voice command platform provides an interface between speech communication with a user and computer-executed voice command applications (or, more generally, "logic"). A person can call an exemplary voice command platform from any telephone or similar device and, by speaking commands, can browse through navigation points (e.g., applications and/or menus items within the applications) to access and communicate information. The voice command platform can thus receive spoken commands from the user and use the commands to guide its execution of voice command applications, and the voice command platform can "speak" to a user as dictated by logic in voice command applications.

For instance, a person may call a voice command platform, and the platform may apply a voice command application that causes the platform to speak to the user, "Hello. Would you like to hear a weather forecast, sports scores, or stock quotes?" In response, the person may state to the platform, "weather forecast." Given this response, the application may cause the platform to load and execute a subsidiary weather forecasting application. The weather forecasting application may direct the platform to speak another speech prompt to the person, such as "Would you like to hear today's weather or an extended forecast?" The person may then respond, and the weather forecasting application may direct the voice command platform to execute additional logic or to load and execute another application based on the person's response.

A robust voice command platform may therefore be able to (i) receive and recognize speech spoken by a user and (ii) provide speech to a user. The platform can achieve these functions in various ways.

On the incoming side, for instance, the platform may include an analog-to-digital (A-D) converter for converting an analog speech signal from a user into a digitized incoming speech signal. (Alternatively, the user's speech signal might already be digitized, as in a voice-over-IP communication system, for instance, in which case A-D conversion would be unnecessary). The platform may then include a speech recognition (SR) engine, which functions to analyze the digitized incoming speech signal and to identify words in the speech. The SR engine will typically be a software module executable by a processor.

As noted above, a voice command application will usually specify which words or "grammar" a user can speak in response to a prompt, for instance. Therefore, the SR engine will seek to identify one of the possible spoken responses.

In order to identify words in the incoming speech, the SR engine will typically include or have access to a dictionary database of "phonemes," which are small units of speech that distinguish one utterance from another. The SR engine will then analyze the waveform represented by the incoming digitized speech signal and, based on the dictionary database, will determine whether the waveform represents particular words.

For instance, if a voice command application allows for a user to respond to a prompt with the grammar elements "sales," "service" or "operator", the SR engine may identify the sequence of one or more phonemes that makes up each of these grammars respectively. The SR engine may then analyze the waveform of the incoming digitized speech signal in search of a waveform that represents one of those sequences of phonemes. (That is, the SR engine may compare a phoneme representation of the spoken utterance to a phoneme representation of each allowed grammar.) Once the SR engine finds a match (or a best match), the voice command platform may continue processing the application in view of the user's spoken response.

Additionally, the SR engine or an ancillary module in the voice command platform may function to detect DTMF tones dialed by a user and to convert those DTMF tones into representative data for use in the execution of a voice command application. Thus, for instance, a voice command application might define a particular DTMF grammar as an acceptable response by a user. Upon detection of that DTMF grammar, the platform may then apply associated logic in the application.

On the outgoing side, the voice command platform may include a text-to-speech (TTS) engine for converting text into outgoing digitized speech signals. The platform may include a digital-to-analog (D-A) converter for converting the outgoing digitized speech signals into audible voice that can be communicated to a user. (Alternatively, the platform might output the digitized speech signal itself, such as in a voice-over-IP communication system using digital networks).

A voice command application may thus specify text that represents voice prompts to be spoken to a user. When the voice command platform encounters an instruction to speak such text, the platform may provide the text to the TTS engine. The TTS engine may then convert the text to an outgoing digitized speech signal, and the platform may convert the signal to analog speech and send it to the user. In converting from text to speech, the TTS engine may also make use of the dictionary database of phonemes, so that it can piece together the words (and pieces of words) that make up the designated speech.

Also on the outgoing side, a voice command platform may include a set of stored voice prompts, in the form of digitized audio files (e.g., *.wav files) for instance. These stored voice prompts would often be common prompts, such as "Hello", "Ready", "Please select from the following options", or the like. Each stored voice prompt might have an associated label (e.g., a filename under which the prompt is stored). By reference to the label, a voice command application might then specify that the voice command platform should play the prompt to a user. In response, the voice command platform may retrieve the audio file, convert it to an analog waveform, and send the analog waveform to the user.

A voice command application can reside permanently on the voice command platform (e.g., as a logical component of the platform), or it can be loaded dynamically into the platform. For instance, the platform can include or be coupled with a network or storage medium that maintains various voice command applications. When a user calls the platform, the platform can thus load an application from the storage medium and execute the application. Further, in response to logic in the application (such as logic keyed to a user's response to a menu of options), the platform can load and execute another application. In this way, a user can navigate through a series of applications and menus in the various applications, during a given session with the platform.

A voice command application can be written or rendered in any of a variety of computer languages. One such language is VoiceXML (or simply "VXML"), which is a tag-based language similar the HTML language that underlies most Internet web pages. (Other analogous languages, such as SpeechML and VoxML for instance, are available as well.) By coding a voice command application in VXML, the application can thus be made to readily access and provide web content, just as an HTML-based application can do. Further, when executed by the voice command platform, the VXML application can effectively communicate with a user through speech.

An application developer can write a voice command application in VXML. Alternatively, an application developer can write an application in another language (such as Jave, C, C++, etc.), and the content of that application can be rendered in VXML. (For instance, when the platform loads an application, the platform or some intermediate entity could transcode the application from its native code to VXML.)

In order for a voice command platform to execute a VXML application or other tag-based application, the platform should include a VXML browser or "interpreter." The VXML interpreter functions to interpret tags set forth in the application and to cause a processor to execute associated logic set forth in the application.

A VXML application can be made up of a number of VXML documents and other objects, just like an HTML web site can made up of a number of HTML pages and objects. A VXML application that is made up of more than one document should include a root document, somewhat analogous to an HTML home page. According to VXML, the root document defines variables that are available to all subsidiary documents in the application. Whenever a user interacts with documents of a VXML application, the root document of the application is also loaded. Therefore, variables defined in the root document should be available during execution of any of the documents of the application.

Customarily, each VXML document will include a <vxml> tag to indicate that it is a VXML document. It may then include a number of <form> sections that can be interactive (e.g., prompting a user for input) or informational (e.g., simply conveying information to a user.) Within a given form, it may further include other executable logic.

A VXML document can also define grammars as described above. In particular, VXML grammars are a set of words or terms ("grammar elements") that the VXML application will accept as input during execution of the application. The VXML document may expressly list the allowed grammar elements, or it may reference a file or other object that defines the allowed grammar elements (just as an HTML document can reference another file). When a VXML application is executed on a voice command platform, the platform may provide the SR engine with an indication of the grammar elements that the VXML application will accept. Once the SR engine detects that a user has spoken one of the grammar elements, the platform may then apply that grammar element as input to the VXML application, typically proceeding to execute a set of logic (e.g., a link to another document) in response.

For example, a VXML document can define, as grammar, a number of possible options, as well as a number of possible words or phrases that a user can speak to select those options. For instance, a document might define as options of clothing the items "hat", "shirt", "pants" and "shoes". In turn, the document might define the following as acceptable grammar elements for the "hat" option: "hat", "visor", "chapeaux" and "beret". Similarly, the grammar element "pause" may consist of subsidiary grammar elements "wait", "hold on", "hold", "pause", etc.

A VXML document or other voice command application can define a set of grammar elements in various ways. For instance, the grammar set could be defined using a well known coded language such as GSL (by Nuance of Menlo Park, Calif.), SRGS (by W3C, as described on the World Wide Web at www.w3.org/TR/speech-grammar/) or BNF (by SpeechWorks), which the voice command platform can translate into, or understand to represent, a particular phoneme or combination of phonemes. Thus, when faced with an utterance from a user, the platform can compare a phoneme representation of the utterance with a phoneme representation of each allowed grammar element, in order to find a best match.

In a typical arrangement, the grammar defined in the root document of a VXML application is, by default, available for use in all of the subsidiary documents of the application. Thus, when a voice command platform is executing a VXML application, if a user speaks a grammar element that is defined in the root document of the application, the voice command platform would responsively execute the logic that accompanies that grammar element in the root document of the application.

In a voice command platform, each navigation point may have a respective identifier or label. For example, each voice command application can have a respective label, such as a network address where the application is maintained. As another example, a voice command application can define a number of successive menus through which a user can browse, and each menu might have a respective label by which it can be referenced. A voice command platform can use these labels to move from application to application or from menu item to menu item, just as hyperlinks operate to cause a browser to move from one web page (or component of one web page) to another.

In VXML, for instance, each VXML document will have a respective Universal Resource Identifier (URI), which is akin to (or a generalization of) a Universal Resource Locator (URL) used to identify the network location of an HTML page. A given VXML document may thus define logic that instructs the voice command platform to load and execute another VXML document or some other object from a designated URI. For instance, a VXML document may indicate that, if a user speaks a particular grammar element, the platform should load and execute a particular VXML document from a designated URI, but that, if the user speaks another grammar element, the platform should load and execute another VXML document from another designated URI.

Referring to the drawings, FIG. 1 is a block diagram illustrating a network architecture in which exemplary embodiments of the present invention can be employed. It should be understood that that the network architecture described herein is set forth for purposes of example only. Those skilled in the art will appreciate that other arrangements and other elements (e.g., machines, interfaces, functions, orders and groupings of functions, etc.) can be used instead, and some elements may be omitted altogether. Further, as in most telecommunication applications, those skilled in the art will appreciate that many of the elements described herein are functional entities that may be implemented as discrete components or in conjunction with other components, and in any suitable combination and location.

As shown in FIG. 1, the network architecture may include a client terminal 12, networks 16, 20, a voice command platform 14, and a voice command application server 18.

The client terminal 12 may be any type of device capable of exchanging voice signals or DTMF signals with a voice command platform 14. The client terminal 12 may be a wireless device such as a cellular telephone. Alternatively, the client terminal 12 may be a wired device such as a landline phone. Indeed, the client terminal 12 could take a variety of forms well-known to those skilled in the art.

The voice command platform 14 may be a computer-based system capable of executing logic of a voice command application. The logic may be computer instructions written in VXML, SpeechML, VoxML, or some other type of computer language. The logic of the voice command application defines user prompts spoken to the users and grammar (allowed utterances) to be spoken by the users, in accordance with the voice command application. By being executed by the voice command platform 14, the logic allows the voice command platform 14 to communicate with a user of the client terminal 12, over the network 20, as dictated by the voice command application.

The network 20 may be a telecommunication network that carries the voice signals, in analog or digital form, between the voice command platform 14 and the client terminal 12. The network 20 may take the form of a radio access network, if, for example, the client terminal is a wireless device such as a cellular telephone. Alternatively, the network 20 may take the form of a public switched telephone network (PSTN) or Internet if, for example, the client terminal is a wired device such as a telephone. Of course, other arrangements are also possible for facilitating exchange of the voice signals between the client terminal 12 and the voice command platform 14.

A network 16 communicatively couples the voice command platform 14 and the voice command application server 18. The network 16 may be a local area network, a wide area network, or even the Internet. The network 16 may carry signals between the application server 18 and the voice command platform 14. The signals may define, for instance, the logic executed by the voice command platform 14.

The application server 18 may be communicatively coupled to a storage medium 22. The storage medium 22 may store the logic for various voice command applications. The storage medium 22 may be directly coupled to the application server 18. Alternatively, the network 16 may communicatively couple the storage medium 22 to the application server 18. The application server 18 may retrieve the logic for a voice command application from the storage medium 22. And, as noted above, the application server 18 may send the logic to the voice command platform 14 for execution by the voice command platform.

Figure 2:
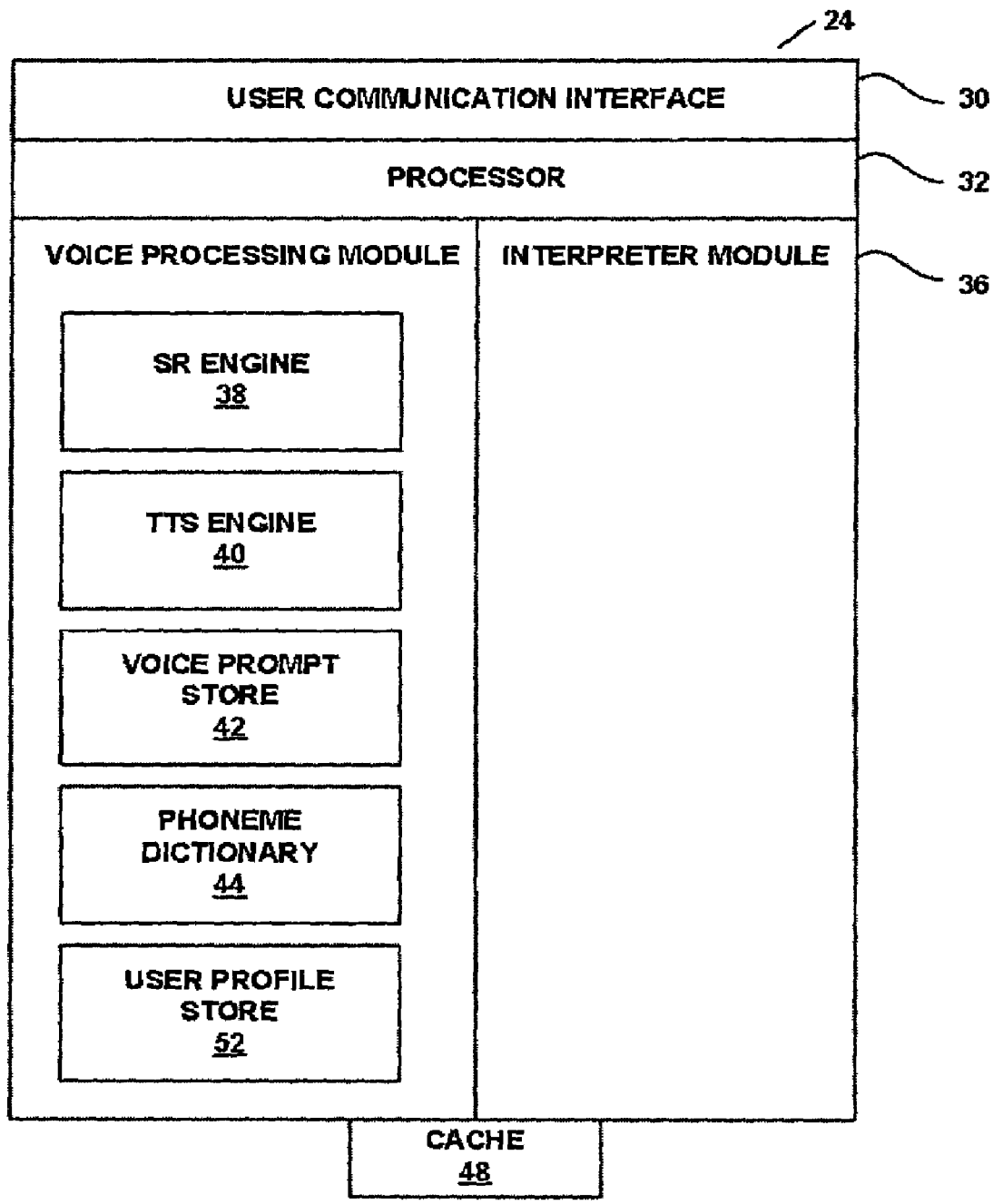
FIG. 2 is a functional block diagram illustrating a system layer of a voice command platform.

FIG. 2 is a functional block diagram illustrating a system layer 24 of the voice command platform. The system layer 24 includes a user communication interface 30, a processor 32 (i.e., one or more processors), a voice-processing module 34, and an interpreter or voice browser module 36. The user communication interface 20 may take various forms. For example, the user communication interface 30 can provide a circuit or packet interface with the network 20. The user communication interface 30 may, in turn, include an A-D and D-A converter (not shown), for converting between analog signals on a user side and digital signals on the voice command platform 14.

Voice-processing module 34 and interpreter module or browser 36 preferably comprise computer instructions executable by the processor 32 to carry out basic voice platform functions. The computer instructions can be stored in suitable data storage, such as ROM or a disk drive for example, but of course other arrangements are also possible.

For instance, the voice-processing module 24 preferably defines a speech recognition engine 38 and a text to speech engine 40, as well as a voice prompt store 42. Further, voice-processing module 34 may include a phoneme dictionary 44. The processor 32 can reference the phoneme dictionary 44 to facilitate operation of the speech recognition engine 38 and the text to speech engine 40.

The interpreter module 36, on the other hand, may execute the logic that the application server 18 sends to the voice command platform 14. The interpreter module 36 may execute the logic of the voice command application. Typically, the interpreter 36 may interpret tag-based languages such as Voice XML or other tag-based language. The interpreter 36, however, may interpret other types of languages. Alternatively, the voice command platform 14 might not be browser-based at all. In that event, the logic that is exchanged between the application server 18 and the voice command platform 14 might not take the form of documents, but rather take the form of some other type of data structure. Of course, other arrangements are also possible for conducting a voice command session with a user.

Additionally, the voice command platform may include a user profile store 52. The user profile store 52 may include information that the platform can use to identify a user and personalize voice command services. The information defined by the user profile store 52 can be maintained in a relational database or in any other manner desired (whether as one module or separate objects, such as a meta-directory for instance), and it can be co-located with the rest of the platform or can be located elsewhere.

For example, the user profile store 52 may have ANI information, such as the billing number or telephone number, for uniquely identifying the user. Additionally or alternatively, the user profile store 52 may have a username and/or password for uniquely identifying the user. Other variations are also possible.

The system layer 24 of the voice command platform additionally has cache 48. The cache 48 functions to temporarily hold the logic of a voice command application (e.g., one or more documents of the voice command application) while the processor 22 is executing the logic. The processor 22 may execute the logic, using the interpreter module 36 to interpret tags, text to speech engine 38 and voice prompt store 40 to send speech to a user, and speech recognition engine 36 to recognize speech spoken by a user.

Figure 3:
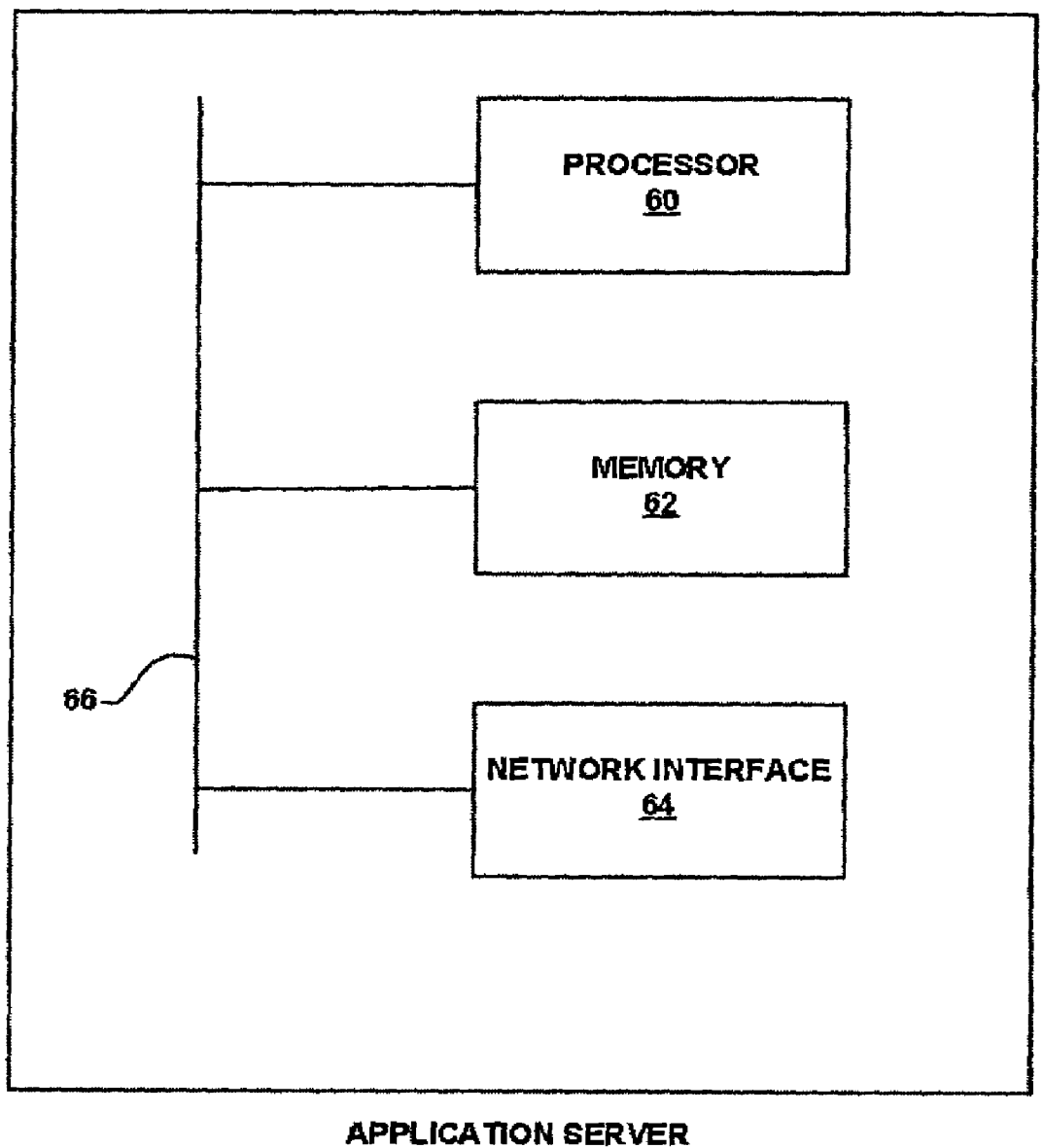
FIG. 3 is a functional block diagram illustrating an exemplary voice command application server.

FIG. 3 illustrates an exemplary architecture of the application server 18. The application server 18 may have a network interface 64, a processor 60, and a memory 62. The network interface 64 may allow the application server 18 to communicate with the voice command platform 14 over the network 16. For example, the network interface 64 can provide a circuit or packet interface with the network 16. Additionally, the network interface 64 may allow the application server 18 to retrieve the logic of a voice command application stored by the storage device 22, either directly coupled to the application server 18 or communicatively coupled to the application server 18 by the network 16. The network interface 64 may take other forms well known to those skilled in the art.

The application server may also have a processor 60 and memory 62. The processor may execute computer instructions stored in the memory 62. The memory 62 may be RAM, ROM, or some other type of storage medium. The computer instructions stored by the memory may facilitate serving the logic of the voice command application to the voice command platform 14.

For example, when a user calls the voice command platform 14, the voice command platform 14 may signal the application server 18 to load a voice command application from the storage medium 22. The processor 50 may be receive the signal and execute computer instructions to load the voice command application into the memory 52. Additionally, the application server 18 may send logic of the application to the voice command platform 14. The logic may take the form of parts of the voice command application, for example, VXML, SpeechML, VoxML, or SALT documents that define the voice command application. Further, a response from the user may result in the voice command platform 14 sending another signal to the application server 18. In response to this signal, the processor 50 may execute computer instructions for sending the additional logic to the voice command platform 14. Again, the voice command platform 14 may execute the logic.

Assigning Event Execution

The global or browser-level grammars are usually a combination of the recommendations of the VoiceXML specification and the necessary grammars identified by the browser provider. The W3C consortium has provided guidelines as part of their VoiceXML specification for the default catch elements that a voice browser is expected to provide. See Boyer, et al., Default Catch Elements, Section 11.5, Voice XML specification 1.0 http://www.w3c.org/TR/voicexml (Mar. 7, 2000) and McGlashan, et al., Default Catch Elements, Section 5.2.5 and Miscellaneous Properties, section 6.3.6, Voice XML specification 2.0 (Apr. 24, 2002), http://www.w3c/TR/2002/WD-voicexml20-20020424.

The VXML specification requires that the voice browser provide the minimum set of event handlers described in the table below, and acknowledges that the voice browser may have additional platform specific event handlers.

TABLE 1

W3C required event handlers

| Event Type | Audio Provided | Action |
| --- | --- | --- |
| Cancel | no | don't reprompt |
| error | yes | exit interpreter |
| exit | no | exit interpreter |
| help | yes | reprompt |
| noinput | no | reprompt |

TABLE 1-continued

W3C required event handlers

| Event Type | Audio Provided | Action |
|---|---|---|
| nomatch | yes | reprompt |
| Telephone disconnect | no | exit interpreter |

Some of the events in Table 1 are triggered when the user invokes the global or browser level grammar elements, such as "cancel", "exit" and "help". Depending on the voice browser environment, events like "bookmark" and "pause" might also be triggered by the user speaking these grammar elements.

In order to determine which events should be handled by the browser and which should be handled by the application in the event of a conflict, a default/override property table can be created. The browser administrator can set one of two properties for each event. If an event type is marked as "override", then the browser will always handle the event even if the application has the same grammar element. If the property is set to "default", the event will be handled by the application. If the application does not support the grammar for an event marked as default, the Global VoiceXML will take over and the browser will present the user with appropriate prompts. Table 2 is an example of a default/override property table; it shows event types and the property associated with each event.

TABLE 2

Default/Override Table Properties of Event Handlers

| Event Type | Event Property |
|---|---|
| Exit | Override |
| Help | Default |
| Cancel | Default |
| Pause | Override |
| Bookmark | Override |

For example, it would make sense for all bookmarks to be handled at the voice browser level. This means that if a user says "bookmark", the browser level bookmark event handler will catch that event and perform the appropriate action. Thus, even if the application had "bookmark" as part of its grammar, that event would be overridden by the event handler in the voice browser since Table 2 states that for the event "bookmark", the property is "override". This ensures that certain events will be handled consistently by the browser across all applications.

There are situations where the global grammar interferes with the application grammar resulting in recognition errors by the speech recognition engine. The following scenario is one example:

Scenario 1:

System: Say the destination city followed by the name of the state.

User: Baltimore

System: I heard you say Bookmark, Correct?

In this instance, the chances of a user saying "Bookmark" instead of "Baltimore" when prompted for a city name (the current application state) are extremely low. Consider scenario 2 in a flight arrival and departure application:

Scenario 2:

System: Say the name of the airport the flight is departing from.

User: Dekalb

System: Did you need help? . . .

In Scenario 2, the flight tracker application asks the user to name the airport where the flight is departing from. In this example the user is looking for Dekalb, Ill. but the speech recognition engine identifies the user utterance "Dekalb" as "Help", which is part of the browser level grammar. Scenarios 1 and 2 are only two examples of how having the entire global grammar active throughout the application can give rise to conflicts, and thereby result in an inferior user experience; this is true regardless of whether the grammar elements are marked as "default" or "override".

In the example of Scenario 2 the global grammar containing "help" and the application level grammar containing all the airport names had equal weight. In other words, the browser had no instructions regarding which meaning of the user's utterance was more likely ("help" or "DeKalb"), thus increasing the probability of a mis-recognition.

One solution to this problem would be to allow application developers to turn off the browser level grammar (in whole or in part) in certain situations. This is the method proposed as part of the VoiceXML 2.0 Working Draft (McGlashan, 2002). While this would reduce recognition problems, it could easily result in situations where the user would be unable to execute certain events (e.g. bookmarking something) making the prior art approach an incomplete solution. Another, more preferred solution, is provided herein which allows the application developer to weight grammar elements based on the application state and the likelihood that the user would utter that grammar element at that state. This preferred solution would not preclude application developers to use the method proposed as part of the VoiceXML 2.0 Working Draft (McGlashan, 2002). The weighting of global level grammars relative to the application level grammars assists the platform in (a) determining whether the utterance is recognized by a speech recognition engine and (b) influencing the confidence level at which the utterance is recognized. This weighting will now be described in more detail in the following section.

Weighting of Grammars

We have developed a solution that involves providing the application developer with a way to weight the browser level grammar against or relative to the application level grammar.

Consider scenario 3:

Scenario 3:

System: Call John Doe on the mobile phone correct?

User: Yes

In this example, the probability of a user saying "bookmark" is quite low since the system is prompting for a "yes or no" answer as a confirmation. One of the ways of increasing the likelihood of a yes/no response from the user being correctly recognized by a speech recognition engine is to reduce the "weight" of other grammars elements at that application state, that is by providing the application developer with a programming feature by which the weight given to particular global grammar elements (or, alternatively all global grammar elements) can be adjusted. For example, the global grammar elements could be weighted on a scale of 1 to 10 or a fractional scale of 0 to 1, and the lower the weight the less likely the user's speech is intended to invoke global grammar elements.

The code shown below gives one example of how this might be implemented in a situation where grammars are weighted in a fractional weighting scheme.

```
<?xml version="1.0"?>

<vxml version="1.0">

<property name="global_grammar_weight" value="0.1"/>

<form>

<field type="boolean" name="call">

Call John Doe on the mobile phone correct?

<filled>
   <if cond="call">
   <goto nextitem="call_transfer"/>
   <else/>
   <goto next="vad_main.vxml"/>
   </if>

</filled>

</field>

<transfer   name="call_transfer"   dest="phone://9131112222"/>

</form>

</vxml>
```

Line 3 of the code calls for a property named global_grammar_weight to be set at 0.1 relative to the application level grammar and/or application level grammar elements. Since the global grammar is an overlay on all the applications, the weight would have to be changed at each application state. This approach would be quite resource intensive since the browser would not only be rendering the VoiceXML document but would also be making changes to the global VoiceXML, thus potentially causing latency in the user experience. Furthermore, this approach relies on application developers to have enough experience with voice-activated systems to set the weighting levels appropriately. Therefore, there are drawbacks to assigning weights in the form of numerical values, at least in some embodiments that are presently contemplated.

In a more preferred embodiment, a programming feature is provided that allows applications developers to assign grammar elements to one of two weighting categories: high or low. A "high" weight means that if a recognition conflict arises between the global grammar and the application grammar, the global grammar gets preference. Conversely, a "low" weight means that if a recognition conflict arises between the global grammar and the application grammar, the application level grammar or grammar elements gets preference. Thus, the proposed solution is to create a platform specific property or variable for the global level grammar elements (individually or collectively as a set) which can be set to "high" or "low". This property is preferably in addition to the proposal in the VoiceXML 2.0 specification, cited previously, of allowing the application developer to disable the browser level grammar for different states. The application developer will have the ability to set this property for the global level grammar(s) for each application state. Alternatively, the application developer can have the property set for the entire application and not have it change from state to state. Additionally, the weighting of global level grammars could be done on an individual basis by providing properties for individual grammar elements. By default, the weight of the global level grammar elements are set to high in a preferred embodiment.

This more preferred embodiment does not mandate or require that application developers be experts in speech recognition or in the field of linguistics. It gives the application developer enough flexibility to improve the user experience, while not being so resource intensive as to be unusable.

In one possible embodiment, a voice command platform includes a programming feature that enables a hybrid approach to be followed. Specifically, the voice browser includes a programming feature, which allows the application developer to turn off the browser level grammar or grammar sets in some instances, but also to set one of two weights ("low" and "high", or less preferably, numerical values) for grammar sets that remain on. The application developer is able to set the weighting of the grammar at any state in the application. The application developer can weight the grammar, individually or collectively for the entire application. The application developer is thus provided with a tool that assists in creating an optimal user experience.

An example will now be given for a programming feature that allows the application developer to weight global grammar element "help" low.

Consider the following speech dialing application that executes in a VoiceXML browser. The user has asked the application to call "John Doe" on the phone. The request is confirmed in this excerpt of code:

```
<?xml version="1.0"?>

<vxml version="1.0">

<property name="global_grammar_weight_help" value="low"/>

<form>

<field type="boolean" name="call">

Call John Doe on the mobile phone correct?

<filled>
   <if cond="call">
   <goto nextitem="call_transfer"/>
   <else/>
   <goto next="vad_main.vxml"/>
   </if>

</filled>

</field>

<transfer   name="call_transfer"   dest="phone://9131112222"/>

</form>

</vxml>
```

Line 3 in the code excerpt calls for a property named global_grammar_weight_help to be set at "low" relative to the application state grammar. The application developer inserts this parameter because, given the present application state, the likelihood of the user saying "help" in response to a prompt "call John Doe on the mobile phone correct?" is low.

In the next example, the application developer could weight "help" low, and also weight "exit" or "cancel" low, since the user may want to cancel the call to John Doe and call someone else. The application developer has determined in this example that these events should be handled by the application level event handlers for the associated application level grammar elements "exit" and "cancel", not the browser level event handlers. (This example assumes that the application includes "exit" and "cancel" grammar elements).

<?xml version="1.0"?>

<vxml version="1.0">

<property name="global_grammar_weight_help" value="low"/>

<property name="global_grammar_weight_exit" value="low"/>

<property name="global_grammar weight_cancel" value="low"/>

<form>

<field type="boolean" name="call">

Call John Doe on the mobile phone correct?

<filled>
  <if cond="call">
  <goto nextitem="call_transfer"/>
  <else/>
  <goto next="vad_main.vxml"/>
  </if>

</filled>

</field>

<transfer name="call_transfer" dest="phone://9131112222"/>

</form>

</vxml>

As an alternative, the speech dialing application could simply set all global grammar elements to "low" for the entire application, or for this particular application state.

In the event that the user clearly states "HELP" in response to a prompt of "call John Doe on the phone, correct?", the likelihood of application level "help" event handlers would be invoked instead of the global level "help" event handlers is increased, if the global_grammar_weight parameter for all global level grammars is set to "low." If, for some reason, the application developers had set the global_grammar_weight parameter to "high", the global level "help" event handler would be invoked, perhaps with some post-processing of the "HELP" response, such as by the system prompting the user with the following: "I heard you say "help", is that correct? Say yes or no." If the user responds "YES", the global help event handler is triggered. If the user responds "NO", the processing reverts back the previous prompt of "call John Doe on the mobile phone, correct?"

Mixed Weighting

As another example, consider a flight tracker application in which the user retrieves flight arrival and departure information. The application level grammar consists of names of airlines, numbers (for flight numbers), a list of cities and airports, and "yes", "no", "correct", "uh-huh", "um", and other similar utterances, both word and non-word. In this application, the developer may want to weight only the "bookmark" and "cancel" global level grammars low, but have "exit" weighted high. Consider for example the scenario 4:

System: Check the arrival time of Delta flight 180, correct?

User: Yes

Here is how the application developer may weight the global level grammars here:

<?xml version="1.0"?>

<vxml version="1.0">

<property name="global_grammar_weight_bookmark" value="low"/>

<property name="global_grammar weight_cancel" value="low"/>

<property name="global_grammar weight_exit" value="high"/>

<form>

<field type="boolean" name="call">

Check the arrival time of Delta flight 180 correct?

<filled>

. . .

Figure 4:
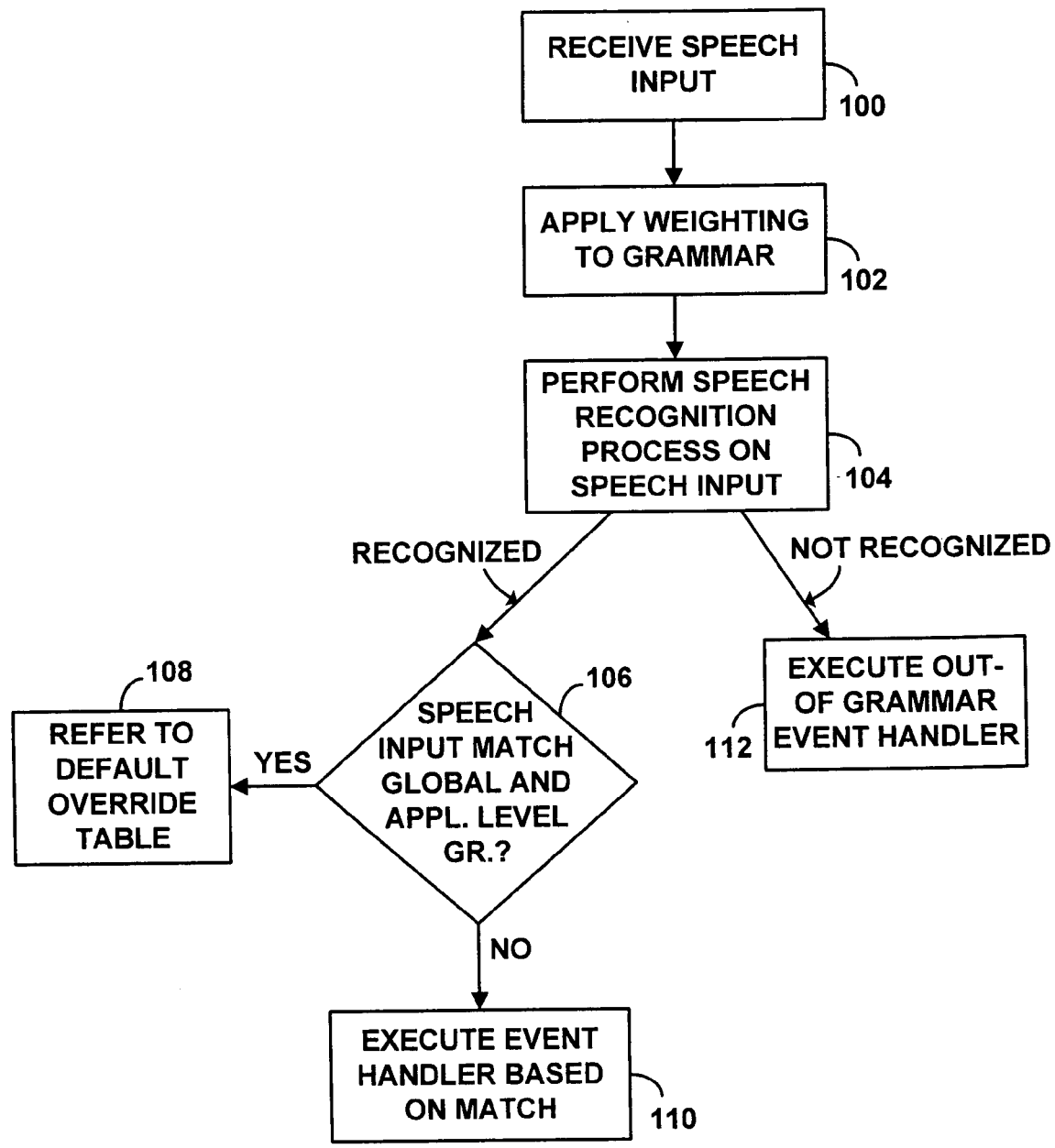
FIG. 4 is a flow chart showing the steps involved when the weighting and the default/override table are used in processing speech input in a voice command platform.

From the foregoing, it will be appreciated that, in general terms, we have described a method for processing speech input in provides for a weighting of global level grammar elements relative to application level grammar or grammar elements. The method is shown in flow chart form in FIG. 4. At step 100, an utterance comprising speech input from a user is received. At step 102, the weighting is applied to global level grammar relative to the application level grammar as explained above. At step 104 the utterance is processed by a speech recognition engine in view of the weighting to determine whether the utterance is recognized and the confidence level at which the utterance is recognized. If the utterance is recognized by the speech recognition engine, the method continues with the step of determining whether the utterance matches any global level grammar elements and/or application level grammar elements. If, as indicated at step 106, the speech input matches both an application level grammar element and the global level grammar element, the process continues to step 108 and a default/override table is consulted to resolve the conflict. If there is a match with only an application level grammar element or a global level grammar element (but not both) the process proceeds to step 110 and the appropriate event handler is executed for the speech input based on the match that was found.

If, at step 104, there was no match between the user's utterance and the application and global level grammars, the process proceeds as indicated at step 112 of invoking an out-of-grammar event handler.

Variation from the disclosed embodiments is contemplated without departure from the scope of the invention. This scope is to be determined by reference to the appended claims.

The invention claimed is:

1. In a computer system comprising a processor and software comprising a set of instructions stored on a machine-readable medium implementing a voice command platform for voice-based applications, said voice command platform including a speech recognition engine, a voice browser having global-level grammar comprising a set of grammar elements and said voice applications having application-level grammar comprising a set of application-level grammar elements, the improvement comprising:

providing in said voice command platform a programming feature by which developers of said voice applications can weight global-level grammar elements relative to the application-level grammar and/or application level grammar elements, whereby said speech recognition engine is more likely to properly determine whether voice input from a user phonetically similar to said global-level grammar elements and/or said application level grammar or grammar elements should trigger events associated with said global-level grammar elements or said application level grammar or grammar elements depending on the weighting of said global level grammar elements.

2. The improvement of claim 1, wherein said weighting programming feature comprises a variable having a value of either "low" or "high".

3. The improvement of claim 1, wherein said weighting programming feature is provided in said voice command platform such that it is available at a plurality of application states in said voice applications.

4. The improvement of claim 1, wherein said weighting programming feature comprises a variable having a numerical value.

5. The improvement of claim 1, wherein said weighting feature is programmably applied to said voice application as a whole.

6. The improvement of claim 1, wherein the improvement further comprises providing a default/override table for resolving conflicts where the voice input from the user matches both a global level grammar element and an application level grammar element, the default/override table determining which grammar element controls the processing of the voice input.

7. The improvement of claim 1, wherein said global level grammar elements are individually weighted.

8. The improvement of claim 1, wherein said global level grammar elements are weighted as a group.

9. The improvement of claim 1, wherein the weighting is implemented by plurality of applications executed by said voice command platform.

10. A computer program comprising a set of instructions stored on a machine-readable medium implementing a voice-based application for execution in a voice command platform, said voice command platform including a speech recognition engine and a voice browser having global-level grammar elements, said voice-based application having application-level grammar and application level grammar elements, the set of instructions comprising:

instructions weighting one or more global-level grammar elements relative to the application-level grammar and/or application level grammar elements, whereby said speech recognition engine is more likely to properly determine whether voice input from a user phonetically similar to said global-level grammar elements and/or said application level grammar or grammar elements should trigger events associated with said global-level grammar elements or said application level grammar or grammar elements depending on the weighting of said global level grammar elements.

11. The computer program of claim 10, wherein said instructions weighting one or more global level grammar elements comprises a variable having a value of either "low" or "high".

12. The computer program of claim 10, wherein said instructions weighting one or more global level grammar elements are provided at a plurality of application states in said voice application.

13. The computer program of claim 10, wherein said instructions weighting one or more global level grammar elements comprises a variable having a numerical value.

14. The computer program of claim 10, wherein said instructions weighting said global level grammar elements are applied to said voice-based application as whole.

15. The computer program of claim 10, wherein the instructions further comprise instructions referring to a default/override table for resolving conflicts where the voice input from the user matches both a global level grammar element and an application level grammar element, the default/override table determining which grammar element controls the processing of the voice input.

16. The computer program of claim 10, wherein said global level grammar elements are individually weighted.

17. The computer program of claim 10, wherein said global level grammar elements are weighted as a group.

18. A method of processing speech input in a voice application executed by a voice command platform, said voice command platform comprising a speech recognition engine and a voice browser having global-level grammar comprising a set of global level grammar elements, said voice application comprising application-level grammar comprising a set of application level grammar elements, the method comprising the steps of:

a) receiving an utterance comprising speech input from a user;

b) applying a weighting of global level grammar elements relative to application level grammar elements;

c) performing a speech recognition process to determine whether the utterance is recognized by a speech recognition engine and the confidence level at which said utterance is recognized;

d) if said utterance matches a global level grammar element and an application level grammar element, invoking an event handler for said utterance by reference to a default/override table; and e) if said utterance matches only one of a global level grammar element or an application level grammar element, invoking an event handler associated with the global level grammar element or application level grammar element that matches the utterance.

19. The method of claim 18, wherein said weighting of global level grammar elements is performed by processing a variable having a value of either "low" or "high".

20. The method of claim 18, wherein said weighting of global level grammar elements is provided at a plurality of application states in said voice application.

21. The method of claim 18, wherein said weighting of global level grammar elements is performed by processing a variable having a numerical value.

22. The method of claim 18, wherein said weighting of global level grammar elements are applied to said voice application as whole.

23. The method of claim 18, wherein said global level grammar elements are individually weighted.

24. The method of claim 18, wherein said global level grammar elements are weighted as a group.

25. A method of processing speech input in a voice application executed by a voice command platform, said voice command platform comprising a speech recognition engine and a voice browser having global-level grammar comprising a set of global level grammar elements, said voice application comprising application-level grammar comprising a set of application level grammar elements, the method comprising the steps of:

a) receiving an utterance comprising speech input from a user;

b) applying a weighting of global level grammar elements relative to application level grammar elements;

c) performing a speech recognition process to determine whether the utterance is recognized by a speech recognition engine and the confidence level at which said utterance is recognized;

d) if said utterance is not recognized in step c), invoking an out of grammar event handler for said utterance.

26. The method of claim 25, wherein said weighting of global level grammar elements is performed by processing a variable having a value of either "low" or "high".

27. The method of claim 25, wherein said weighting of global level grammar elements is provided at a plurality of application states in said voice application.

28. The method of claim 25, wherein said weighting of global level grammar elements is performed by processing a variable having a numerical value.

29. The method of claim 25, wherein said weighting of global level grammar elements are applied to said voice application as whole.

30. The method of claim 25, wherein said global level grammar elements are individually weighted.

31. The method of claim 25, wherein said global level grammar elements are weighted as a group.

32. A method of processing speech input in a voice application executed by a voice command platform, said voice command platform comprising a speech recognition engine and a voice browser having global-level grammar comprising a set of global level grammar elements, said voice application comprising application-level grammar comprising a set of application level grammar elements, the method comprising the steps of:

a) receiving an utterance comprising speech input from a user;

b) applying a weighting of global level grammar elements relative to application level grammar elements;

c) performing a speech recognition process to determine whether the utterance is recognized by a speech recognition engine and the confidence level at which said utterance is recognized, said speech recognition process determining whether the utterance matches any global level grammar elements and/or application level grammar elements.

33. The method of claim 32, wherein said weighting of global level grammar elements is provided at a plurality of application states in said voice application.

34. The method of claim 32, wherein said weighting of global level grammar elements is performed by processing a variable having a numerical value.

35. The method of claim 32, wherein said weighting of global level grammar elements are applied to said voice application as whole.

36. The method of claim 32, wherein said global level grammar elements are individually weighted.

37. The method of claim 32, wherein said global level grammar elements are weighted as a group.

* * * * *